United States Patent
Bae et al.

(10) Patent No.: US 8,208,618 B2
(45) Date of Patent: Jun. 26, 2012

(54) APPARATUS AND METHOD FOR ORIGINATING CALL BY USING IMAGE

(75) Inventors: Joo-Yoon Bae, Seoul (KR); Ji-Seon Won, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 1211 days.

(21) Appl. No.: 11/969,048

(22) Filed: Jan. 3, 2008

(65) Prior Publication Data
US 2008/0170681 A1   Jul. 17, 2008

(30) Foreign Application Priority Data
Jan. 3, 2007   (KR) ................. 10-2007-0000811

(51) Int. Cl.
*H04M 3/42* (2006.01)
(52) U.S. Cl. .............................. 379/216.01; 379/201.04
(58) Field of Classification Search ............. 379/216.01, 379/93.17, 201.01, 201.04; 235/492; 455/414.1, 455/566; 345/173
See application file for complete search history.

(56) References Cited

U.S. PATENT DOCUMENTS

| 6,764,018 B1* | 7/2004 | Ringen et al. ............. 235/492 |
| 6,879,846 B1* | 4/2005 | Miyata ....................... 455/566 |
| 2005/0181774 A1* | 8/2005 | Miyata ................... 455/414.1 |
| 2010/0002854 A1* | 1/2010 | Fulton et al. ............ 379/93.17 |

FOREIGN PATENT DOCUMENTS
KR    1020060031472    4/2006

* cited by examiner

*Primary Examiner* — Thjuan K Addy
(74) *Attorney, Agent, or Firm* — The Farrell Law Firm, P.C.

(57) ABSTRACT

Provided is an apparatus and method for searching a phone number and originating a call by using an image in a mobile communication terminal having a touch screen. The apparatus includes the touch screen for displaying at least one image in an image area, a memory unit for storing at least one image and a phone number corresponding thereto, and a control unit for performing call origination by using the phone number corresponding to each image if a touch input is made onto the relevant image displayed in the image area.

12 Claims, 7 Drawing Sheets

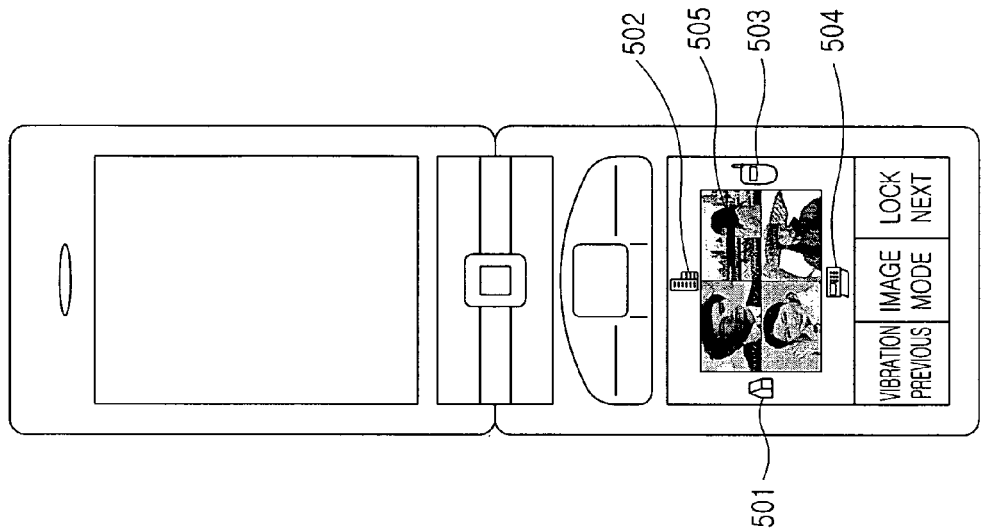
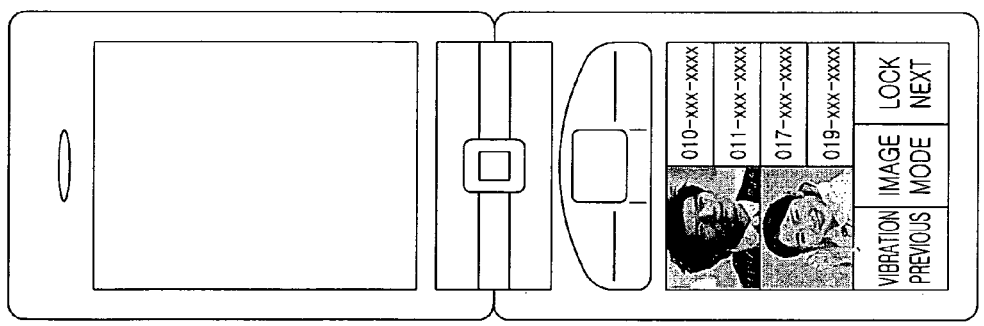
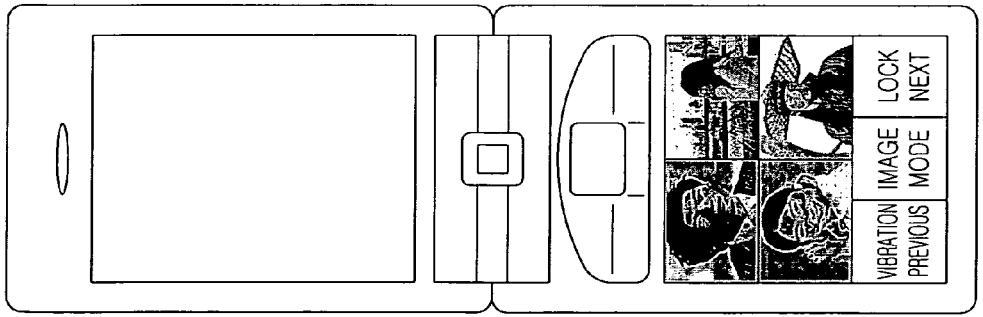

APPARATUS AND METHOD FOR ORIGINATING CALL BY USING IMAGE

PRIORITY

This application claims priority under 35 U.S.C. §119(a) to an application entitled "Apparatus and Method for Originating Call by Using Image" filed in the Korean Industrial Property Office on Jan. 3, 2007 and assigned Serial No. 2007-0000811, the contents of which are hereby incorporated by reference.

BACKGROUND OF THE INVENTION

1. Field of the Invention

The present invention relates to an apparatus and method for originating a call in a mobile communication terminal, and more particularly to an apparatus and method for performing phone number search and call origination by using an image in a mobile communication terminal.

2. Description of the Related Art

Mobile communication terminals are becoming increasingly popular because of their convenience of carrying. Thus, service providers (terminal manufacturers) have competitively developed terminals with very special functions in order to attract more users, and as a result of this, a terminal with a multimedia input/output device has recently been popularized. However, a phonebook search/dialing function leaves much room for improvement in user convenience.

A phonebook function employed in a mobile communication terminal refers to a function that enables the user of a mobile communication terminal to perform phone number searches mainly by inputting a person's name and finding a desired phone number in a search result listed in order by name. In addition to this, the phonebook function enables the user to perform a phone number search by using a partial phone number, group classification, storage time or the like. Some terminals provide a direct dialing function using speech recognition.

Further, there is widely used abbreviated dialing technology in which one- to three-digit abbreviated numbers, for example, 1000 abbreviated numbers from 0 to 999, are assigned to frequently used phone numbers, and dialing is easily performed using the assigned abbreviated number without inputting the whole phone number.

Among the 1000 abbreviated numbers as mentioned above, not all abbreviated numbers are actually used for abbreviated dialing. Also, in order to originate a call by using the abbreviated dialing, the user of a mobile communication terminal must memorize an abbreviated number corresponding to a desired destination phone number, which causes inconvenience to the user. That is, there is a problem in that, the user of a mobile communication terminal does not know abbreviated numbers other than those assigned to frequently used phone numbers.

SUMMARY OF THE INVENTION

Accordingly, the present invention has been made to solve the above-mentioned problems occurring in the prior art, and the present invention provides an apparatus and method for searching a phone number stored corresponding to an image by using the image, and directly dialing the searched phone number in a mobile communication terminal.

In accordance with an aspect of the present invention, there is provided an apparatus for originating a call by using an image, the apparatus including a touch screen for displaying at least one image in an image area; a memory unit for storing the at least one image and a phone number corresponding thereto; and a control unit for performing call origination by using the phone number corresponding to each image if a touch input is made onto the relevant image displayed in the image area.

In accordance with another aspect of the present invention, there is provided a method of originating a call by using an image in a mobile communication terminal having a touch screen, the method including storing at least one image and a phone number corresponding thereto; displaying the at least one image on an image area of the touch screen if an image dialing mode is selected; confirming the phone number corresponding to each image if a touch input is made onto the relevant image displayed in the image area of the touch screen; and performing call origination by using the confirmed phone number.

BRIEF DESCRIPTION OF THE DRAWINGS

The above and other aspects, features and advantages of the present invention will be more apparent from the following detailed description taken in conjunction with the accompanying drawings, in which:

FIG. 7 is a view illustrating screens displayed when an image dialing mode is performed in accordance with an exemplary embodiment of the present invention.

DETAILED DESCRIPTION OF THE EXEMPLARY EMBODIMENT

Figure 1:
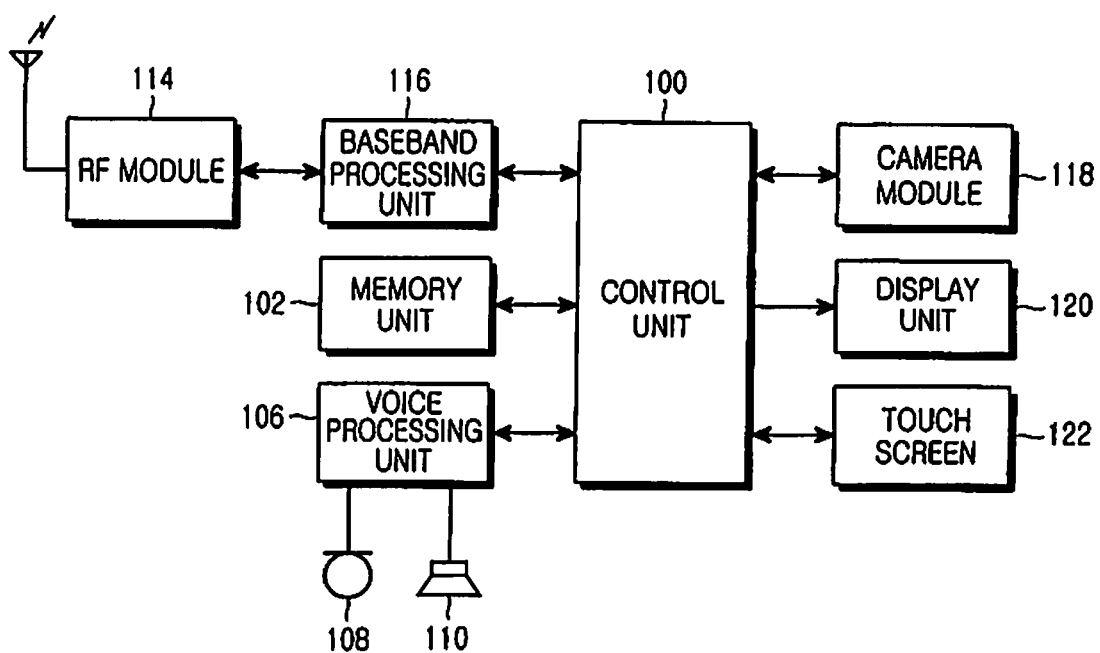
FIG. 1 is a block diagram illustrating the internal structure of a mobile communication terminal for applying embodiments of the present invention thereto.

Hereinafter, exemplary embodiments of the present invention will be described with reference to the accompanying drawings. In the following description, the same elements will be designated by the same reference numerals although they are shown in different drawings. Further, in the following description, only parts necessary for understanding operations of the present invention will described, and a detailed description of known functions and configurations incorporated herein will be omitted so as not to make the subject matter of the present invention rather unclear.

FIG. 1 illustrates the internal structure of a mobile communication terminal for applying embodiments of the present invention thereto. The mobile communication terminal according to the present invention is provided with a dual LCD. The dual LCD is used, on one hand, as an LCD that displays a screen for data representation, and on the other hand, as a touch screen that displays keys for key input and perceives input keys.

A control unit 100 processes and controls various functions, such as a telephone call, data communication, camera photography, etc. The operation of the control unit 100 according to the present invention will be described in detail below with reference to FIGS. 3 and 4. A memory unit 102 stores programs for processing and control by the control unit 100, reference data, various updatable data, etc., and is provided as a working memory of the control unit 100. Particularly, in the present invention, the memory unit 102 stores an environment set for performing an image dialing mode. Here, the environment for performing an image dialing mode refers to an environment including image-related information, such as an image display format, an image configuration according to the number of images to be displayed on one screen, and so forth. The image display format is information on how to arrange images on a screen. For example, it is possible to display only images, stored in a phonebook, on a touch screen 122, as illustrated in (a) of FIG. 7, and it is also possible to display images together with phone numbers corresponding thereto on the touch screen 122, as illustrated in (b) of FIG. 7. Further, as illustrated in (c) of FIG. 7, icons representing the types of phone numbers may be displayed together on the upper, lower, left and right sides of images. In the case of (a) or (b) of FIG. 7, if the user of the mobile communication terminal selects a desired image by clicking a region where the desired image is displayed, then a call can be originated to a phone number stored corresponding to the selected image. In the case of (c) of FIG. 7, if the user selects a destination user by clicking a region where a desired image is displayed, and selects a destination phone number by clicking one of icons 501, 502, 503, and 504 representing the types of phone numbers stored corresponding to the destination user, then a call can be originated to the relevant phone number.

Alternatively, in the case of FIG. 7 (*c*), the user may select a destination phone number by performing drag-clicking in the direction of an icon corresponding to the destination phone number in a region where a desired image is displayed. For example, when the user intends to originate a call to the cellular phone number of a destination user corresponding to the right image in the first row, he/she can perform call origination through right-drag-clicking as designated by reference numeral "505".

That is, in the present invention, automatic dialing is made when the user clicks an image of the desired called party. When two or more phone numbers are stored corresponding to the relevant image, the user can select one of them. To select a phone number, all stored phone numbers are displayed in a roll-up window, and dialing to the desired phone number is automatically done if the user clicks a desired one of them ((b) of FIG. 7). In another way to select a phone number; icons representing the types of phone numbers are placed on the upper, lower, left and right sides of images, and dialing to a desired type of phone number is automatically done if the user drags a selected image in the upper, lower, left or right direction ((c) of FIG. 7).

The image configuration according to the number of images to be displayed on one screen is information on how many images are displayed on one screen. For example, in (a) of FIG. 7, a total of 4 images are displayed in a 2×2 matrix structure. This image configuration according to the number of images may employ various structures, such as 2×2, 3×3, and 4×4 matrix structures, so long as images displayed on a screen have the minimal identifiable size.

The touch screen 122 functions as a key input unit, and displays numeric keys of 0 to 9, the * (asterisk) key, the # (sharp) key, and various function keys, such as menu, select, call, delete, on/off, volume, and camera keys. Further, the touch screen 122 provides the control unit 100 with key input data corresponding to the user's touches. Particularly, in the present invention, the touch screen 122 displays images for phone number search and call origination under the control of the control unit 100, and has a separate key for selecting/canceling the image dialing mode. For example, the touch screen 122 has an image dialing mode key as designated by reference numeral "500", which enables the user to select and cancel the image dialing mode whenever he/she clicks the image dialing mode key in a toggle manner.

A voice processing unit 106, is connected to the control unit 100, a microphone 108 and a speaker 110 and is used for a telephone calls and voice recording.

An RF (Radio Frequency) module 114 transmits/receives radio signals to/from a mobile communication base station through an antenna. To be specific, the RF module 114 modulates a signal to be transmitted, which is input from the control unit 100 via a baseband processing unit 116, and transmits the modulated RF signal through an antenna. Further, the RF module 114 demodulates an RF signal received through the antenna, and provides the demodulated signal to the control unit 100 via the baseband processing unit 116. The baseband processing unit 116 processes a baseband signal transmitted/received between the RF module 114 and the control unit 100.

A camera module 118 outputs an image frame captured by an image sensor. In the present invention, the camera module 118 is provided so as to photograph images of destination users corresponding to phone numbers, but is not indispensably provided. When the mobile communication terminal is not provided with the camera module 118, it can download images used for phone number search and call origination.

A display unit 120 displays various messages and so forth under the control of the control unit 100. Further, the display unit 120 may be formed by an LCD (Liquid Crystal Display), a TFT (Thin Film Transistor), an Organic EL (Organic Electro-Luminescence) display, etc.

Figure 2:
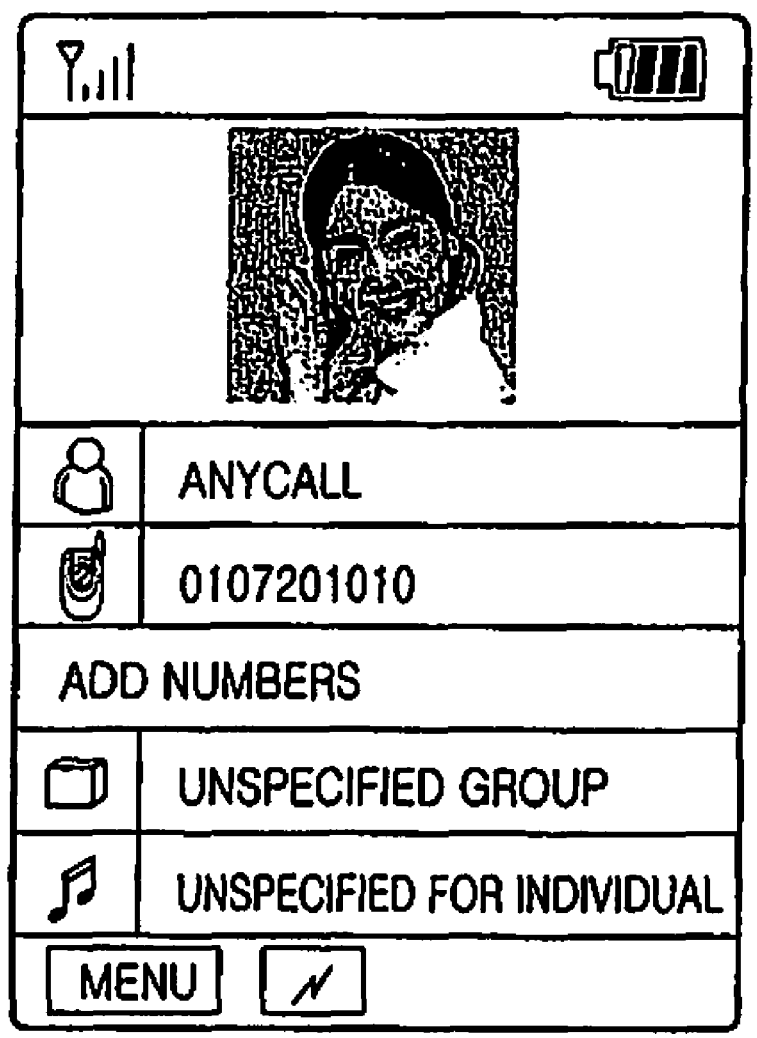
FIG. 2 is a view illustrating a common screen for storing a phone number.

FIG. 2 illustrates a common screen for storing a phone number. When a phone number is stored, the name of a person using the phone number is basically stored together with the phone number, and an image corresponding to the phone number such as, for example, a face image of a destination user using the phone number or an icon image, may be additionally stored. In the present invention, an image is basically stored corresponding to a phone number in order to enable phone number search/call origination using an image. Of course, when an image is not stored, it is also possible to configure a screen for phone number search in such a manner as to display a name corresponding to a phone number, instead of an image.

Figure 3:
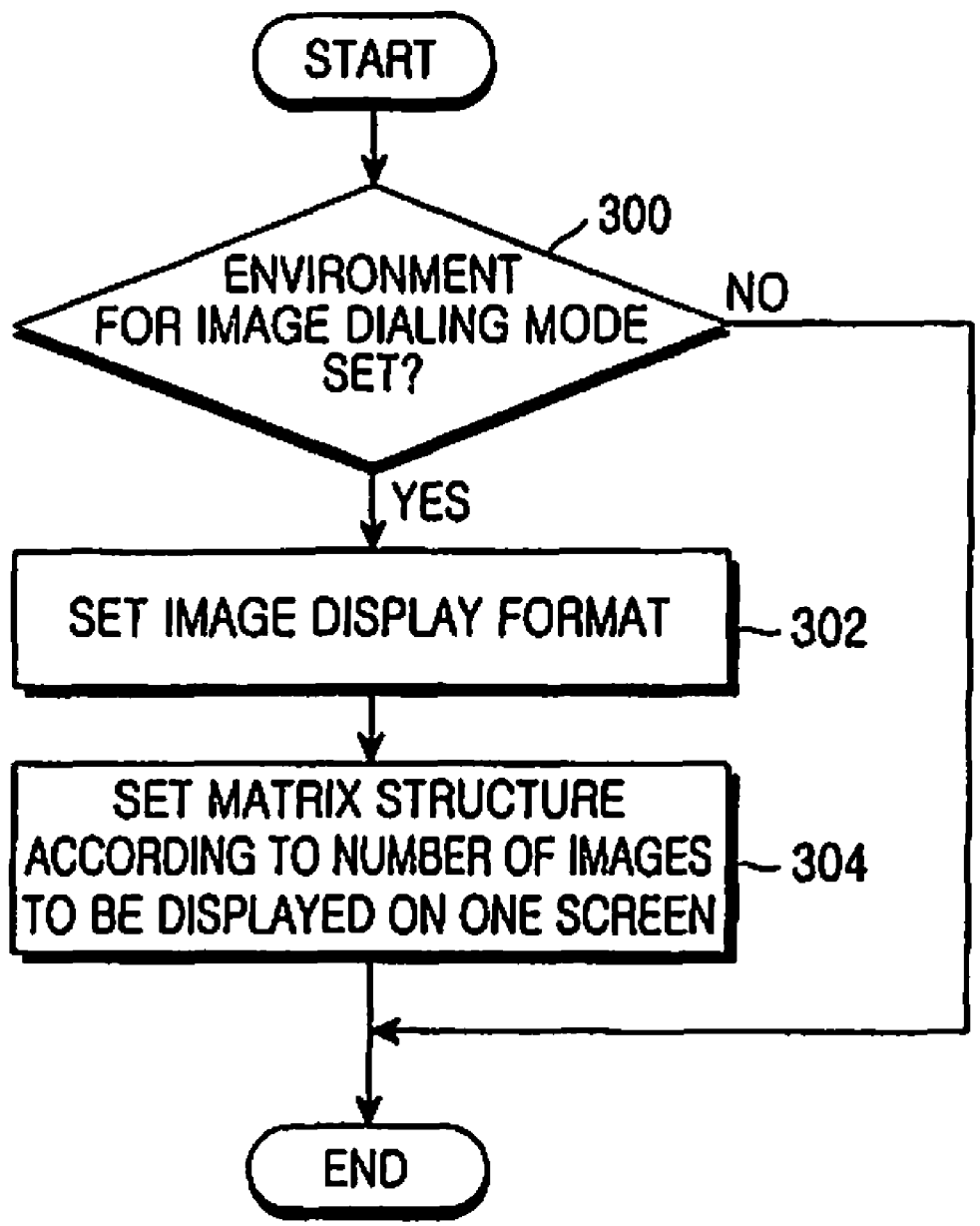
FIG. 3 is a flowchart illustrating a procedure of setting an environment for performing an image dialing mode in accordance with an exemplary embodiment of the present invention.

FIG. 3 illustrates a procedure of setting the environment for the image dialing mode according to an exemplary embodiment of the present invention.

First, in step 300, the control unit 100 checks if the user requests it to set the environment for the image dialing mode. If the request for setting the environment for the image dialing mode is made in step 300, the control unit 100 goes to step 302, and displays a screen for selecting an image display format. Once the user selects a specific image display format, the control unit 100 stores the selected image display format in the memory unit 102. Here, the image display format is information on how to arrange images on a screen, as mentioned above. The image display format may be any one of a format in which only images are displayed and a format in which images are displayed together with additional information. The user may flexibly select the number of images to be displayed on one screen, and store frequently originated phone numbers together with images corresponding thereto.

The control unit 100 displays images according to the selected image display format and the selected number of images on the LCD keypad as the touch screen, thereby allowing the user to design a dialing keypad to his/her desire.

Next, in step 304, the control unit 100 displays a screen for selecting an image configuration according to the number of images to be displayed on one screen, and stores the image configuration selected by the user in the memory unit 102. For example, the user may select a 2×2 structure configuration as illustrated in (a) of FIG. 7, a 1×N structure configuration as illustrated in (b) of FIG. 7, a 3×3 structure configuration, a 4×4 structure configuration, or the like.

Figure 4:
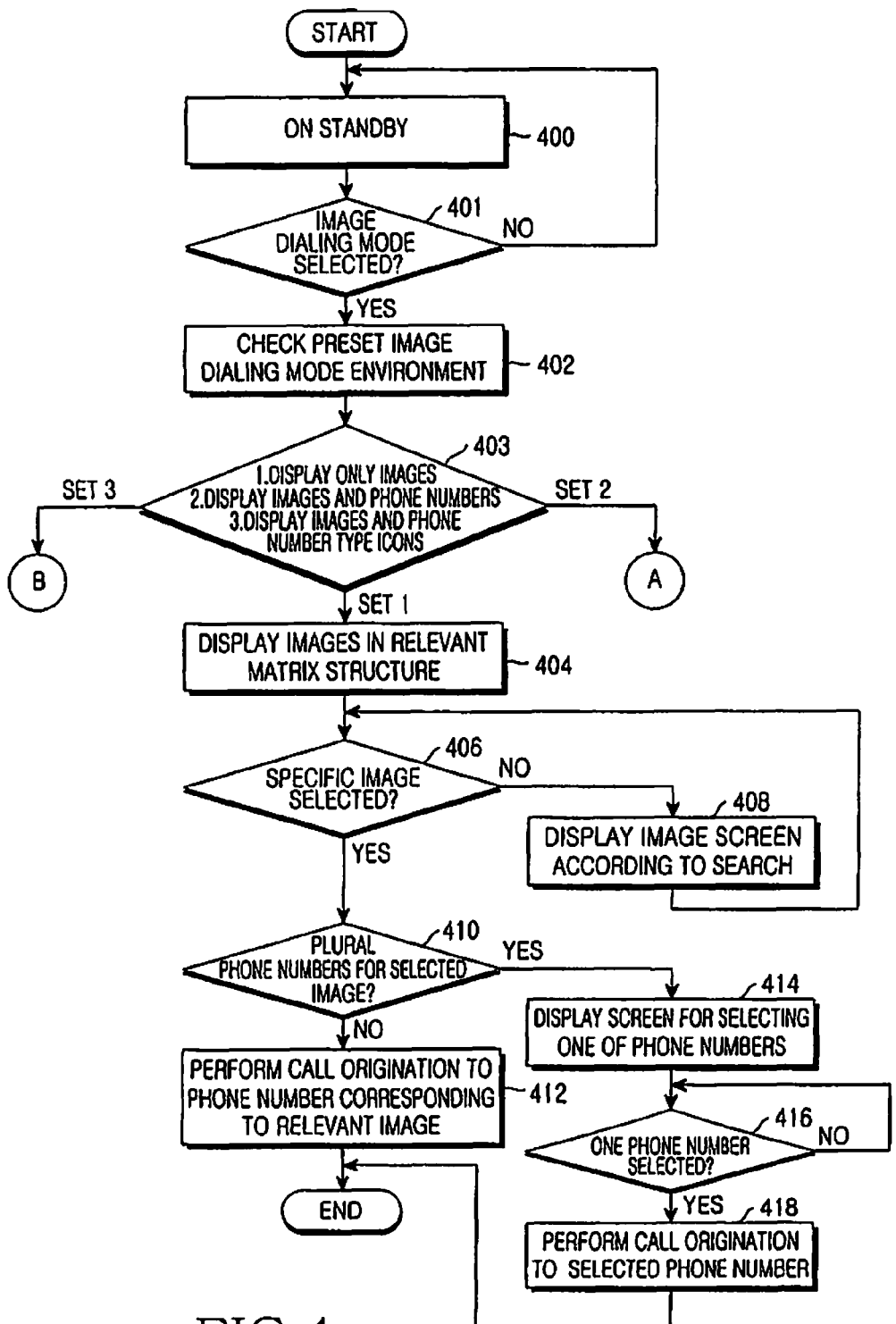
FIG. 4 is a flowchart illustrating a procedure of performing an image dialing mode in accordance with a first embodiment of the present invention.

Reference will now be made to a procedure of performing the image dialing mode according to the environment for the image dialing mode, set through the procedure of FIG. 3, with reference to FIG. 4.

First, the control unit 100 that is on standby in step 300 checks in step 301 if the user makes an input for selecting the image dialing mode. If the input for selecting the image dialing mode is made, the control unit 100 goes to step 403, and checks the environment for the image dialing mode, set in advance through the procedure of FIG. 3. Subsequently, the control mode goes to step 403, and checks whether the image display format set in the environment for the image dialing mode corresponds to format I in which only images are displayed as in (a) of FIG. 7, format II in which images are displayed together with phone numbers, as in (b) of FIG. 7, or format III in which images are displayed together with icons representing the types of phone numbers, as in (c) of FIG. 7. Next, the control unit 100 performs steps 404 to 418 when the checked image display format corresponds to format I, performs steps 502 to 506 in FIG. 5 when the checked image display format corresponds to format II, and performs steps 602 to 608 when the checked image display format corresponds to format III. First of all, a description will be given of the case where the current image display format set in the environment for the image dialing mode corresponds to format I, with reference to FIG. 4.

Upon going from step 403 to step 404, the control unit 100 checks the image configuration set in the environment for the image dialing mode, and displays images on the touch screen 122 according to the checked image configuration. As an example, when the image display format corresponds to format I, and the image configuration corresponds to a 2×2 structure configuration, images displayed on the touch screen 122 may be configured as illustrated in (a) of FIG. 7. As another example, when the image display format corresponds to format II, and the image configuration corresponds to a 1×N structure configuration, images displayed on the touch screen 122 may be configured as illustrated in (b) of FIG. 7.

Subsequently, if the user makes an input for selecting an image by clicking a specific region corresponding to the image in step 406, the control unit 100 goes to step 410, and otherwise, goes to step 408 in which it continues to display the images for phone number search on the touch screen 122.

Upon going from step 406 to step 410, the control unit 100 checks if the number of phone numbers corresponding to the selected image is one. If the number of phone numbers corresponding to the relevant image is at least two, the control unit 100 goes to step 414, and otherwise, goes to step 412 in which it performs dialing to the phone number corresponding to the relevant image.

Further, upon going from step 410 to step 414, the control unit 100 displays phone numbers corresponding to the selected image on the touch screen 122. Here, a way to display the phone numbers on the touch screen 122 includes two schemes, one of which is to create a popup window and display the phone numbers in the created popup window while keeping intact the already displayed screen, and the other of which is to display only the selected image and the relevant phone numbers on the whole touch screen 122. Subsequently, the control unit 100 checks if the user makes an input for selecting one of the displayed phone numbers by clicking a region where the relevant phone number is displayed. If one of the displayed phone numbers is selected in this way, the control unit goes to step 418, and performs call origination to the selected phone number.

Figure 5:
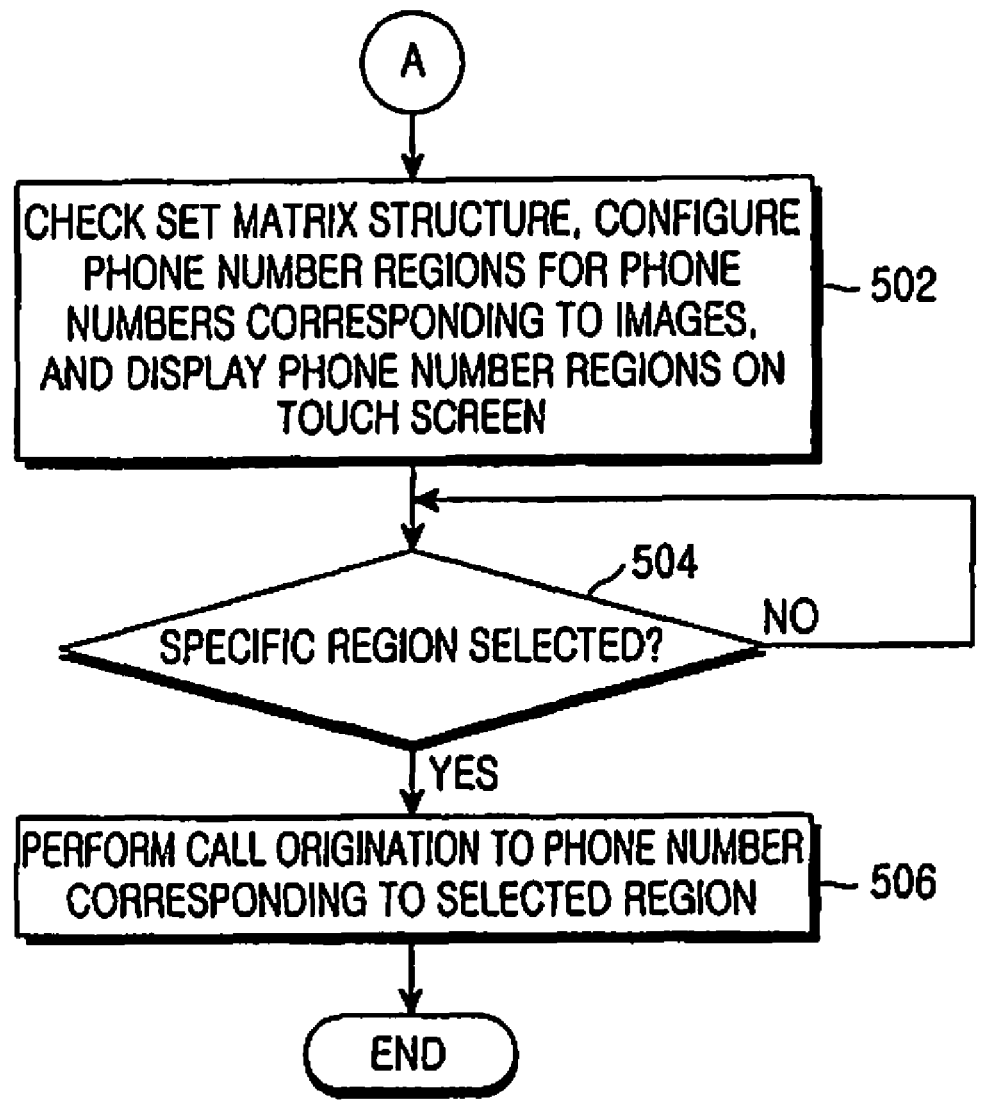
FIG. 5 is a flowchart illustrating a procedure of performing an image dialing mode in accordance with a second embodiment of the present invention.
Figure 6:
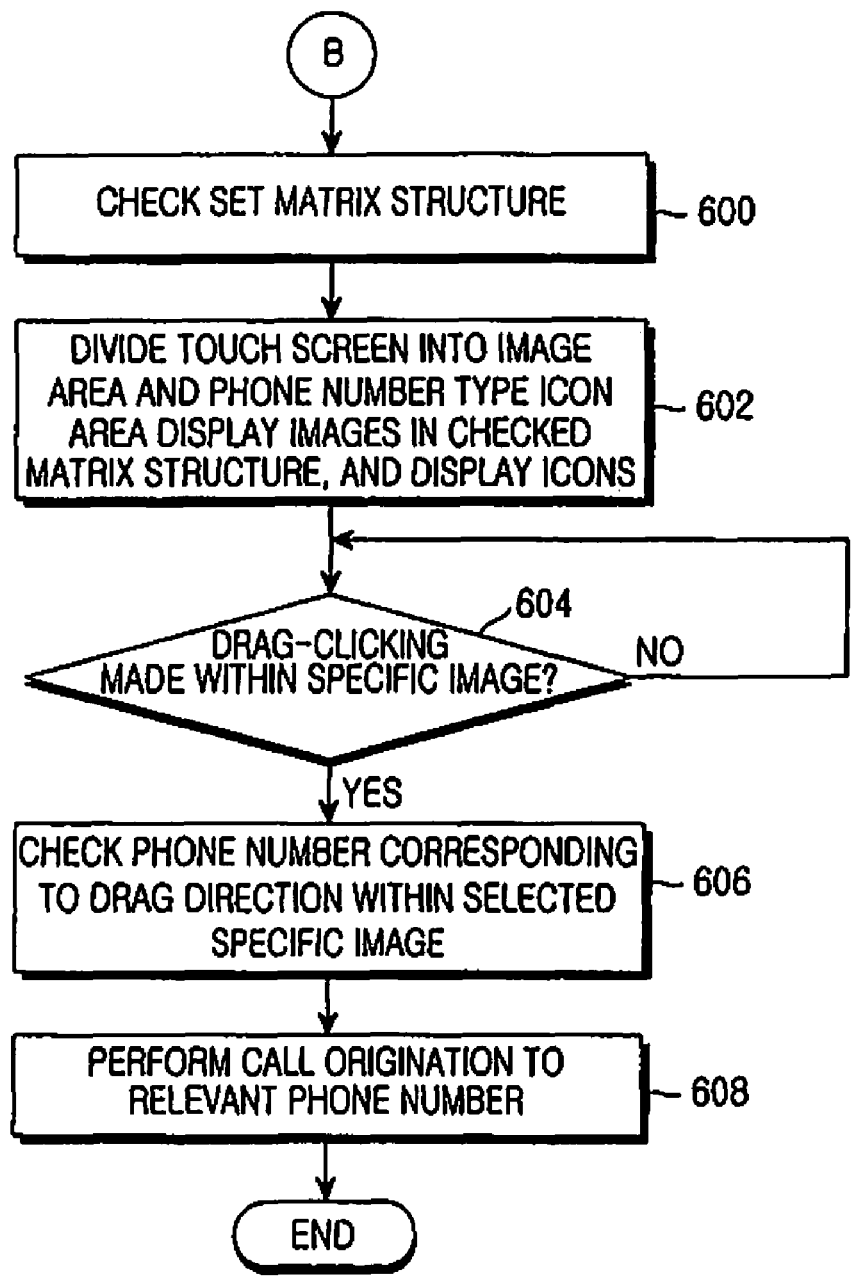
FIG. 6 is a flowchart illustrating a procedure of performing an image dialing mode in accordance with a third embodiment of the present invention.

In the case where the current image display format set in the environment for the image dialing mode corresponds to format II, the control unit 100 goes to step 502 in FIG. 5, and checks the image configuration set in the environment for the image dialing mode. Based on the checked image configuration, the control unit 100 configures phone number regions corresponding to respective images, and displays the respective images and the phone number regions corresponding thereto on the touch screen 122. For example, if the set image configuration corresponds to a 1×N structure configuration, the control unit 100 displays respective images and phone number regions corresponding thereto on the touch screen, as illustrated in (b) of FIG. 7. Subsequently, if the user selects a specific phone number region, the control unit 100 goes to step 504, and performs call origination to a phone number corresponding to the selected region. Here, region selection refers to selecting a relevant phone number by clicking a specific region displayed in the touch screen 122.

In the case where the current image display format set in the environment for the image dialing mode corresponds to format III, the control unit 100 goes to step 602 in FIG. 5, and checks the image configuration set in the environment for the image dialing mode. Then, the control unit 100 divides the touch screen 122 into an image area and an icon area, displays images in the image area according to the checked image configuration, and displays icons, which represent the types of phone numbers, in the icon area.

Subsequently, the control unit 100 goes to step 604, and checks if drag-clicking in any direction is made within a specific image. If drag-clicking is made within a specific image, the control unit 100 goes to step 606. In step 606, the control unit 100 checks a phone number corresponding to the direction of drag-clicking made within the specific image. For example, when the user's drag-clicking is made in the right direction within an image 505, as illustrated in (c) of FIG. 7, the cellular phone number is retrieved from among phone numbers corresponding to the image 505, and the control unit 100 performs call origination to the retrieved phone number in step 608.

In order to perform the image dialing mode, the user may search images displayed on the touch screen 122 by using left and right buttons that are located below dial keys, as illustrated in FIG. 7. For example, in the case of a 2×2 structure configuration, 4 images for performing the image dialing mode are displayed first on the touch screen 122, and next 4 images are further displayed when the user moves to the next screen by using the left and right buttons. Also, if the user long presses the image dialing mode select/cancel button during the image dialing mode, the keypad configured for the image dialing mode can be switched to the keypad for displaying general keys.

As described above, the present invention can provide a speed dialing function using an image in such a manner that images of destination users are displayed on an LCD keypad in a mobile communication terminal with the LCD keypad, and if the user of the terminal selects one of the images, automatic dialing to a phone number corresponding to the selected image is performed.

Further, since various images can be displayed on the LCD keypad, the user can perform call origination only by selecting a desired image without memorizing abbreviated numbers as in the conventional speed dialing function. Therefore, the present invention can provide a mobile communication terminal that confused elderly users can easily use.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An apparatus for originating a call by using an image, the apparatus comprising:
   a touch screen for displaying at least one image in an image area;
   a memory unit for storing the at least one image and a phone number corresponding thereto; and
   a control unit for performing call origination using the phone number corresponding to a displayed image in an input image area if a touch input is made on the relevant image displayed in the image area,
   wherein the control unit stores an image display format and a matrix structure according to a number of images to be displayed on the touch screen, which are set by a request from a user for setting an environment for an image dialing mode, in the memory unit,
   wherein the image display format is any one of a format in which only images are displayed, a format in which images are displayed together with phone numbers, and a format in which images are displayed together with icons representing types of phone numbers.

2. The apparatus as claimed in claim 1, wherein the image area of the touch screen is divided according to the set matrix structure.

3. The apparatus as claimed in claim 1, wherein, if the image dialing mode is selected, the control unit divides the image area of the touch screen into at least one region according to the set matrix structure, and displays images, stored in the memory unit, in the respective regions.

4. The apparatus as claimed in claim 3, wherein the image display format is any one of a format in which only images are displayed, a format in which images are displayed together with phone numbers, and a format in which images are displayed together with icons representing types of phone numbers.

5. The apparatus as claimed in claim 4, wherein, if the image dialing mode is selected, the control unit configures the touch screen in the image display format set in advance.

6. The apparatus as claimed in claim 1, further comprising a display unit for displaying input data,
   wherein, if two or more phone numbers are stored corresponding to the image selected by the touch input when the control unit performs the call origination using the phone number corresponding to the selected image, the control unit displays a screen for selecting one of the phone numbers through the display unit, and then performs the call origination by using the selected phone number.

7. A method of originating a call by using an image in a mobile communication terminal having a touch screen, the method comprising the steps of:
   storing at least one image and a phone number corresponding thereto;
   displaying the at least one image on an image area of the touch screen if an image dialing mode is selected;
   confirming the phone number corresponding to a displayed image in an input image area if a touch input is made on the relevant image displayed in the image area of the touch screen;
   performing call origination using the confirmed phone number; and
   previously storing an image display format and a matrix structure according to a number of images to be displayed on the touch screen that are set by a request from a user for setting an environment for the image dialing mode;
   wherein the image display format is any one of a format in which only images are displayed, a format in which images are displayed together with phone numbers, and a format in which images are displayed together with icons representing types of phone numbers.

8. The method as claimed in claim 7, wherein the image area of the touch screen is divided according to the set matrix structure.

9. The method as claimed in claim 7, wherein displaying the image if the image dialing mode is selected comprises, if the image dialing mode is selected, dividing the image area of the touch screen into at least one region according to the set matrix structure, and displaying stored images in the respective regions.

10. The method as claimed in claim 9, wherein the image display format is any one of a format in which only images are displayed, a format in which images are displayed together with phone numbers, and a format in which images are displayed together with icons representing types of phone numbers.

11. The method as claimed in claim 10, wherein displaying the image if the image dialing mode is selected comprises, if the image dialing mode is selected, configuring the touch screen in the image display format set and stored in advance.

12. The method as claimed in claim 7, further comprising:
   checking if two or more phone numbers are stored corresponding to the image selected by the touch input when performing the call origination by using the phone number corresponding to the selected image;
   if a result of the checking shows that two or more phone numbers are stored corresponding to the selected image, displaying a screen for selecting one of the phone numbers; and
   performs the call origination by using the selected phone number.

* * * * *